UNITED STATES PATENT OFFICE.

CHARLES B. DUDLEY, OF ALTOONA, PENNSYLVANIA.

METHOD OF PURIFYING WATER FOR BOILER USE.

SPECIFICATION forming part of Letters Patent No. 291,168, dated January 1, 1884.

Application filed August 25, 1883. (No specimens.)

*To all whom it may concern:*

Be it known that I, CHARLES B. DUDLEY, of Altoona, county of Blair, and State of Pennsylvania, have invented new and useful Improvements in the Art of Purifying Waters; and I do hereby declare that the following is a full and exact description of the same.

This discovery relates to the art of purifying waters for boiler use; and it consists in the use of caustic baryta followed by carbonate of soda, the whole process being in one operation.

It is well known that certain waters which it is desired to use for boiler purposes contain such large amounts of mineral matter—such as sulphates and carbonates of lime and magnesia—that their use is followed by serious incrustations, causing loss of heat and damage to the boilers, and that certain other waters—notably, those mixed with the drainage of mines and pickling-liquors from galvanizing-works, &c.—contain such large amounts of corrosive constituents—such as sulphuric acid and sulphates of iron and alumina—that they cannot be used without great loss and damage to the boilers.

The object of this discovery is to render all these waters fit for use in steam-boilers by removing the objectionable material from the waters.

The method of carrying my discovery practically into effect is as follows: The water having been analyzed to ascertain its constituents, is treated with caustic baryta in sufficient amount to combine with the carbonic acid, both free and as bicarbonates, the sulphuric acid and the chlorine combined with lime and magnesia, iron and alumina, provided any or all of these are present. The water is then agitated for an hour (more or less) to effect thorough mixture and allow the remaining chemical reactions to take place. Carbonate of soda is then added in sufficient amount to precipitate, as carbonates, any lime or baryta salts that may be in solution in the water. This agitation is then continued sufficiently long to allow the necessary reactions to take place. The water is then allowed to settle, when the clear water above the precipitate is ready for use. The principal chemical reactions which take place in the above-described method are probably as follows: The carbonic acid, both free and as bicarbonates, combines with the baryta, forming carbonate of baryta, which precipitates. The sulphuric acid combines with the baryta, forming sulphate of baryta, which precipitates. The chlorine will probably unite with the caustic baryta, forming chloride of barium, which will remain in solution. The carbonates of lime and magnesia held in solution by carbonic acid will be precipitated by the combination of the carbonic acid with the caustic baryta. The lime and magnesia, iron and alumina, combined with sulphuric acid, will separate as hydrates. Of these the iron, alumina, and magnesia will precipitate. The lime—at least a portion of it—will remain in solution. This caustic lime and the chloride barium are precipitated as carbonates by the carbonate of soda.

It is possible that some other reactions than those above given may take place; but the above are the principal reactions, and the result of the whole is that by far the largest portion of the objectionable impurities originally in the water are removed and the water rendered alkaline and fit for boiler use.

Having thus fully described my discovery, what I claim as new, and desire to secure by Letters Patent, is—

The herein-described method of purifying waters, consisting in treating the same first with caustic baryta and then with carbonate of soda, the whole process being in one operation, as set forth.

CHAS. B. DUDLEY.

Witnesses:
THEODORE S. WEST,
WM. T. EMERSON.